(12) United States Patent
Wang et al.

(10) Patent No.: US 12,548,309 B2
(45) Date of Patent: Feb. 10, 2026

(54) LABEL INHERITANCE FOR SOFT LABEL GENERATION IN INFORMATION PROCESSING SYSTEM

(71) Applicant: Dell Products L.P., Round Rock, TX (US)

(72) Inventors: Zijia Wang, WeiFang (CN); Jiacheng Ni, Shanghai (CN); Wenbin Yang, Shanghai (CN); Kenneth Durazzo, Morgan Hill, CA (US); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 641 days.

(21) Appl. No.: 17/569,030

(22) Filed: Jan. 5, 2022

(65) Prior Publication Data

US 2023/0215155 A1    Jul. 6, 2023

(51) Int. Cl.
G06F 16/00     (2019.01)
G06F 16/55     (2019.01)
G06F 16/583    (2019.01)
G06V 10/82     (2022.01)

(52) U.S. Cl.
CPC .............. G06V 10/82 (2022.01); G06F 16/55 (2019.01); G06F 16/583 (2019.01)

(58) Field of Classification Search
CPC ............................... G06F 16/55; G06F 16/583
USPC ........................................................ 707/736
See application file for complete search history.

(56) References Cited

U.S. PATENT DOCUMENTS

| | | | | |
|---|---|---|---|---|
| 8,358,856 B2* | 1/2013 | Loui | ................... | G06F 16/5838 382/226 |
| 9,075,824 B2* | 7/2015 | Gordo | ................... | G06F 16/583 |
| 9,990,687 B1* | 6/2018 | Kaufhold | ............. | G06N 3/0985 |
| 10,929,757 B2* | 2/2021 | Baker | ................... | H04L 67/142 |
| 11,068,782 B2* | 7/2021 | Lyske | ................ | G06F 16/9024 |
| 11,461,415 B2* | 10/2022 | Lu | .......................... | G06F 40/284 |
| 11,657,340 B2* | 5/2023 | Cella | ................... | G06F 18/2148 712/216 |
| 11,684,241 B2* | 6/2023 | Crosby | .................. | G06N 20/00 706/12 |
| 11,748,414 B2* | 9/2023 | Mohanty | ............. | G06N 3/0442 707/739 |

(Continued)

OTHER PUBLICATIONS

E. Strubell et al., "Energy and Policy Considerations for Deep Learning in NLP," Proceedings of the 57th Annual Meeting of the Association for Computational Linguistics, Jul. 28-Aug. 2, 2019, pp. 3645-3650.

(Continued)

*Primary Examiner* — Ann J Lo
*Assistant Examiner* — Rezwanul Mahmood
(74) *Attorney, Agent, or Firm* — Ryan, Mason & Lewis, LLP

(57) ABSTRACT

Label inheritance techniques are disclosed for soft label generation in an information processing system that uses machine learning. For example, a method generates at least one label for a given data instance from a training data set useable to train a machine learning-based model. The at least one label is generated by assigning one or more labels associated with one or more ancestors of the data instance such that the data instance inherits the one or more labels associated with the one or more ancestors as the at least one label.

20 Claims, 6 Drawing Sheets

(56) References Cited

U.S. PATENT DOCUMENTS

| | | | | |
|---|---|---|---|---|
| 11,791,914 | B2* | 10/2023 | Cella | G06N 3/045 |
| | | | | 702/188 |
| 11,868,428 | B2* | 1/2024 | Rhee | G06F 18/22 |
| 12,165,311 | B2* | 12/2024 | Hao | G06N 20/10 |
| 12,299,070 | B2* | 5/2025 | Wang | G06V 20/56 |
| 12,327,206 | B2* | 6/2025 | Jia | G06F 16/285 |
| 12,374,089 | B2* | 7/2025 | Wang | G06V 10/774 |
| 2006/0253418 | A1* | 11/2006 | Charnock | G06F 16/34 |
| 2009/0080731 | A1* | 3/2009 | Krishnapuram | G06F 18/24155 |
| | | | | 382/128 |
| 2013/0290222 | A1* | 10/2013 | Gordo | G06F 18/2155 |
| | | | | 707/769 |
| 2014/0143251 | A1* | 5/2014 | Wang | G06F 16/285 |
| | | | | 707/737 |
| 2014/0307958 | A1* | 10/2014 | Wang | G06F 18/214 |
| | | | | 382/159 |
| 2017/0083608 | A1* | 3/2017 | Ye | G06N 20/10 |
| 2018/0204111 | A1* | 7/2018 | Zadeh | G06N 3/0464 |
| 2019/0095788 | A1* | 3/2019 | Yazdani | G06N 3/045 |
| 2019/0205748 | A1* | 7/2019 | Fukuda | G06N 3/044 |
| 2019/0213503 | A1* | 7/2019 | Navratil | G06F 9/541 |
| 2019/0303742 | A1* | 10/2019 | Bonnell | G06N 3/0495 |
| 2019/0325269 | A1* | 10/2019 | Bagherinezhad | G06N 3/0464 |
| 2019/0355115 | A1* | 11/2019 | Niebauer | G06N 20/00 |
| 2020/0110982 | A1* | 4/2020 | Gou | G06V 10/82 |
| 2020/0174433 | A1* | 6/2020 | Hughes | G06F 16/212 |
| 2020/0184278 | A1* | 6/2020 | Zadeh | G06N 3/044 |
| 2020/0250971 | A1* | 8/2020 | Zhao | G08G 1/09675 |
| 2020/0257976 | A1* | 8/2020 | Polanía Cabrera | G06N 3/0495 |
| 2020/0401929 | A1* | 12/2020 | Duerig | G06N 20/00 |
| 2021/0034985 | A1* | 2/2021 | Vongkulbhisal | G06N 3/098 |
| 2021/0142177 | A1* | 5/2021 | Mallya | G06N 3/084 |
| 2021/0201003 | A1* | 7/2021 | Banerjee | G06V 10/774 |
| 2021/0350176 | A1* | 11/2021 | Klaiman | G06F 18/214 |
| 2021/0358101 | A1* | 11/2021 | Neumann | G06F 18/2155 |
| 2021/0374504 | A1* | 12/2021 | Kurasawa | G06N 3/045 |
| 2021/0383306 | A1* | 12/2021 | Somashekairah | G06N 20/00 |
| 2021/0390270 | A1* | 12/2021 | Fei | G06F 40/197 |
| 2022/0035867 | A1* | 2/2022 | Tambi | G06F 40/263 |
| 2022/0121884 | A1* | 4/2022 | Zadeh | G06N 3/006 |
| 2022/0164714 | A1* | 5/2022 | Hron, II | G06F 40/279 |
| 2022/0180065 | A1* | 6/2022 | Liu | G06N 3/08 |
| 2022/0198274 | A1* | 6/2022 | Shindin | G06N 3/0895 |
| 2022/0230425 | A1* | 7/2022 | Kosiorek | G06F 18/2415 |
| 2022/0237436 | A1* | 7/2022 | Shin | G06N 3/0442 |
| 2022/0237788 | A1* | 7/2022 | Shaul | G16H 50/70 |
| 2022/0254190 | A1* | 8/2022 | Gallagher | G06F 16/583 |
| 2022/0300761 | A1* | 9/2022 | Zhang | G06N 3/0464 |
| 2022/0360515 | A1* | 11/2022 | Vaina | H04L 67/535 |
| 2022/0391433 | A1* | 12/2022 | Maheshwari | G06V 10/426 |
| 2023/0020886 | A1* | 1/2023 | Mahapatra | G06N 3/08 |
| 2023/0022845 | A1* | 1/2023 | Meng | G06Q 10/10 |
| 2023/0083724 | A1* | 3/2023 | Cella | G06F 16/24537 |
| | | | | 705/28 |
| 2023/0162005 | A1* | 5/2023 | Cheng | G06F 16/9035 |
| | | | | 706/15 |
| 2023/0169331 | A1* | 6/2023 | Vasilev | G06N 3/0455 |
| | | | | 382/155 |
| 2023/0215155 | A1* | 7/2023 | Wang | G06F 16/55 |
| | | | | 382/156 |
| 2023/0274422 | A1* | 8/2023 | Peleg | G16H 30/40 |
| | | | | 382/128 |
| 2023/0319099 | A1* | 10/2023 | Karimibiuki | H04L 63/145 |
| | | | | 726/23 |
| 2023/0342364 | A1* | 10/2023 | Pavlovic | G06N 3/09 |
| 2023/0394387 | A1* | 12/2023 | Jia | G06N 20/20 |
| 2023/0401274 | A1* | 12/2023 | Denninghoff | G06Q 30/0251 |
| 2024/0020526 | A1* | 1/2024 | Bondi | G10L 25/30 |
| 2024/0029416 | A1* | 1/2024 | Wang | G06V 10/7747 |
| 2024/0037131 | A1* | 2/2024 | Magureanu | G06F 16/355 |
| 2024/0119260 | A1* | 4/2024 | Wang | G06N 3/045 |
| 2024/0185564 | A1* | 6/2024 | Wang | G06V 10/82 |
| 2024/0202494 | A1* | 6/2024 | Ming Chang | G06F 16/24549 |
| 2024/0205140 | A1* | 6/2024 | Lokhandwala | H04L 45/24 |
| 2024/0338532 | A1* | 10/2024 | Pauli | G06F 16/35 |
| 2024/0419873 | A1* | 12/2024 | Yu | G06F 30/27 |
| 2025/0037429 | A1* | 1/2025 | Wang | G06V 10/774 |
| 2025/0037430 | A1* | 1/2025 | Wang | G06V 10/72 |
| 2025/0165544 | A1* | 5/2025 | Shou | G06F 16/906 |

OTHER PUBLICATIONS

G. Hinton et al., "Distilling the Knowledge in a Neural Network," arXiv:1503.02531v1, Mar. 9, 2015, 9 pages.

T. Wang et al., "Dataset Distillation," arXiv:1811.10959v3, Feb. 24, 2020, 14 pages.

S. Sabour et al., "Dynamic Routing Between Capsules," arXiv:1710.09829v2, Nov. 7, 2017, 11 pages.

Y. Lecun et al., "Gradient-Based Learning Applied to Document Recognition," Proceedings of the IEEE, Nov. 1998, 46 pages.

* cited by examiner

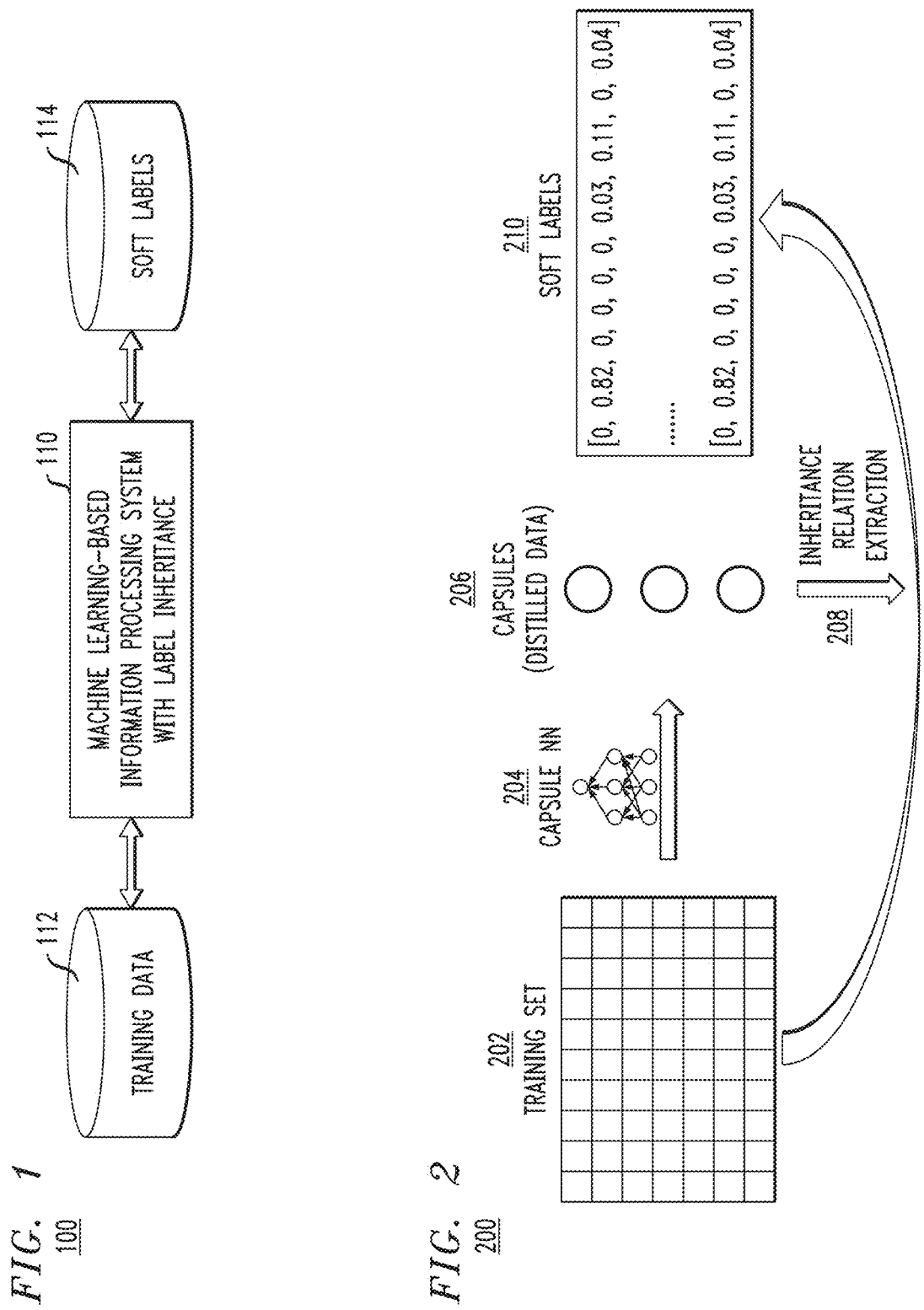

300

LABEL INHERITANCE FOR SOFT LABEL GENERATION IN INFORMATION PROCESSING SYSTEM

FIELD

The field relates generally to information processing systems, and more particularly to label generation in such information processing systems.

BACKGROUND

In an information processing system environment that implements artificial intelligence in the form of a machine learning (ML) model, a data labeling process is typically used to generate labels for training data sets (e.g., text-based raw data, image-based raw data, video-based raw data, etc.) so that the ML model can use the labels, inter alia, to process data sets that are subsequently received by the information processing system.

Some existing data labeling processes generate so-called hard labels. A hard label is a label assigned to a member of a class where membership is binary, i.e., a data instance of a data set is either a member of a given class and therefore has a label, or it is not a member of the given class and therefore has no label. The process then explicitly propagates class labels at each iteration of the information processing system.

Other existing data labeling processes generate so-called soft labels. A soft label is a label assigned to a data instance that includes a probability or class-membership score to indicate a measure of likelihood that the data instance is a member of the given class. The process then propagates these scores throughout the information processing system. Soft labels can be used in many tasks to capture the uncertainty of information. However, conventional soft label generation processes tend to be inexplicit and thus may abstract useful features associated with the training data.

SUMMARY

Illustrative embodiments provide label inheritance techniques for soft label generation in an information processing system that uses machine learning.

For example, in one illustrative embodiment, a method comprises generating at least one label for a given data instance from a training data set useable to train a machine learning-based model. The at least one label is generated by assigning one or more labels associated with one or more ancestors of the data instance such that the data instance inherits the one or more labels associated with the one or more ancestors as the at least one label.

Further illustrative embodiments are provided in the form of a non-transitory computer-readable storage medium having embodied therein executable program code that when executed by a processor causes the processor to perform the above steps. Still further illustrative embodiments comprise apparatus with a processor and a memory configured to perform the above steps.

Advantageously, illustrative embodiments provide improved soft label generation techniques that leverage capsules and probabilistic bag of images (PBoI) representations to explicitly generate soft labels. The techniques can also be applied in, inter alia, data set distillation and self-training applications.

These and other features and advantages of embodiments described herein will become more apparent from the accompanying drawings and the following detailed description.

BRIEF DESCRIPTION OF THE DRAWINGS

FIG. 1 illustrates a machine learning-based information processing system environment with label inheritance according to an illustrative embodiment.

FIG. 2 illustrates a machine learning-based information processing system with a capsule neural network employing label inheritance according to an illustrative embodiment.

DETAILED DESCRIPTION

Figure 3:
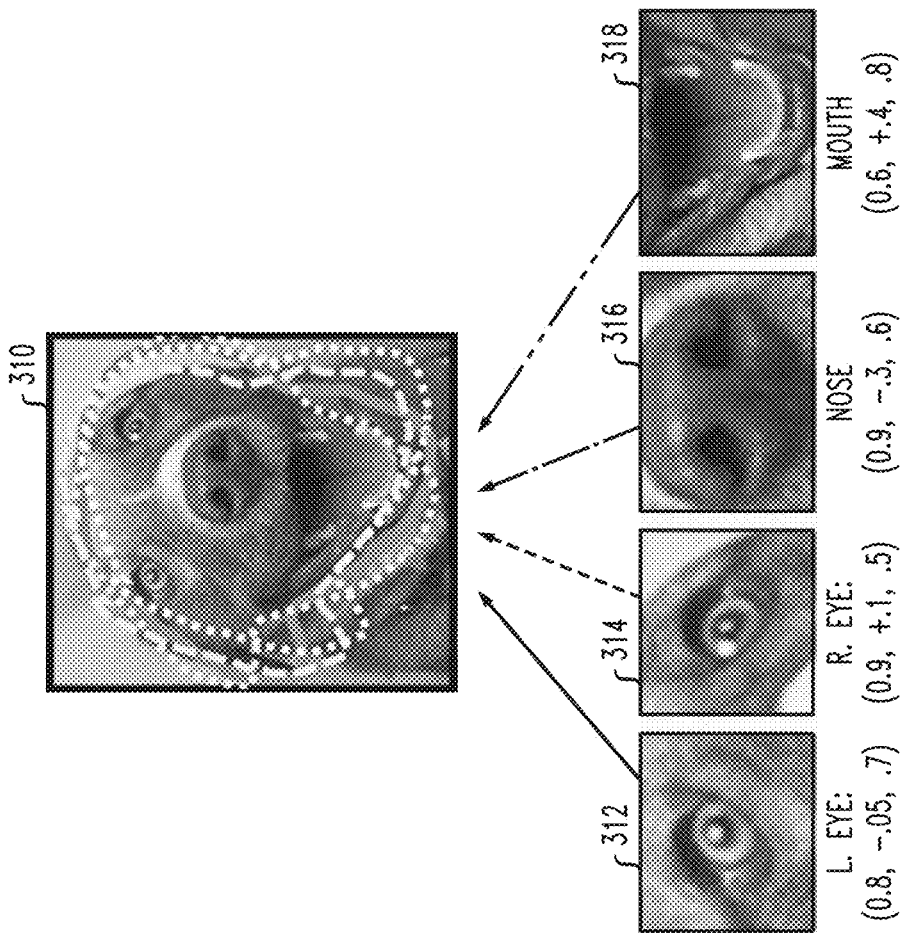
FIG. 3 illustrates an example of image-based training data and corresponding capsules associated with a capsule neural network according to an illustrative embodiment.

Illustrative embodiments will now be described herein in detail with reference to the accompanying drawings. Although the drawings and accompanying descriptions illustrate some embodiments, it is to be appreciated that alternative embodiments are not to be construed as limited by the embodiments illustrated herein. Furthermore, as used herein, the term "includes" and its variants are to be read as open-ended terms that mean "includes, but is not limited to." The term "based on" is to be read as "based at least in part on." The term "an embodiment" and "the embodiment" are to be read as "at least one example embodiment." The terms "first," "second," and the like may refer to different or the same objects. Other definitions, either explicit or implicit, may be included below.

As mentioned above in the background section, existing soft label generation techniques tend to be inexplicit/unexplainable and thus may abstract useful features associated with the training data. Illustrative embodiments overcome these and other technical problems with existing soft label generation approaches by introducing the concept of label inheritance to generate soft labels for new data and/or synthesized data, as will be further explained herein.

FIG. 1 generally illustrates an information processing system environment 100 according to an illustrative embodiment. More particularly, information processing system environment 100 comprises a machine learning-based information processing system 110 that is configured to implement soft label generation with label inheritance on processing training data 112 to generate soft labels 114.

Label inheritance will be illustrated in exemplary data distillation and self-training tasks to show the effectiveness of the improved soft label generation algorithm. However, it is to be appreciated that the concept of label inheritance is not limited to these two illustrative information processing tasks and thus may be applied to a wide variety of other tasks.

FIG. 2 illustrates a machine learning-based information processing system 200 with a capsule neural network employing label inheritance according to an illustrative embodiment. It is to be appreciated that machine learning-based information processing system 200 is one example of an information processing system that can be implemented in information processing system environment 100 of FIG. 1.

As shown in FIG. 2, for training set 202, a capsule neural network 204 derives capsules 206 representing topics (e.g., distilled images) from images in training set 202. More particularly, for each topic, a probabilistic bag of images (PBoI) representation is obtained from capsule neural network 204. These topics are considered the distilled data while the PBoI representation provides an indication to identify the ancestors of capsules (distilled data) 206. Then, through inheritance relation extraction step 208, the labels of these ancestors can be used to generate soft labels 210 of capsules (distilled data) 206.

By way of further detail, capsule neural network 204 is first trained based on training images from training set 202 to obtain capsules 206. Capsules 206 can be used as distilled data in downstream tasks. Then, inheritance relation extraction step 208 calculates the relation between capsules 206 and training set 202 to obtain a PBoI representation for each capsule from which soft labels for capsules 206 are generated.

It is to be appreciated that, in a self-training application, distilled data can be used to obtain smooth pseudo-labels for unseen data, then these pseudo-labels can be used to complete the self-training process. In data set distillation (also known as proxy data generation), because the topic generation process used in illustrative embodiments is explainable and explicit, either the topics or the top images in each topic can be used as the distilled data. Then, the distilled data can be used for effective performance in tasks such as data fusion and few-shot learning compared with conventional data set distillation algorithms.

It is to be understood that a capsule neural network, such as capsule neural network 204, mimics neuron-based brain functioning by incorporating dynamic routing algorithms to estimate features of objects such as pose, e.g., position, size, orientation, deformation, velocity, albedo, hue, texture, and so on. The dynamic routing algorithms perform their computations on their inputs and then encapsulate the results into a small vector of highly informative outputs, i.e., a capsule. A capsule can be considered a replacement or substitute for an average artificial neuron of an artificial neural network (ANN). However, while an artificial neuron deals with scalars, a capsule deals with vectors. As shown in example 300 of FIG. 3, for an image-based data set (data instance) such as image 310, capsules 312, 314, 316 and 318 are generated wherein each respectively represents an internal pattern (or local feature) of image 310 which is considered meaningful, e.g., left eye 312, right eye 314, nose 316, and mouth 318.

Advantageously, illustrative embodiments consider these capsules as topics in topic models, which can also be viewed as distilled data (e.g., capsules (distilled data) 206) which captures pattern information.

However, it is further realized that the increase in computational requirements for modern deep learning (i.e., a form of ML that is based on an artificial neural network) presents a range of technical problems. It has been found that the training of deep learning models has an extremely high energy consumption, on top of already problematic financial and computational cost and time requirements. One path for mitigating these technical problems is by reducing network sizes. Knowledge distillation has been proposed as a method for imbuing smaller, more efficient networks with all the knowledge of their larger counterparts. Instead of decreasing network size, a second path to efficiency may instead be to decrease data set size. Data set distillation (DD) has been proposed as an alternative formulation to realize this second path.

More particularly, data set distillation is the process of creating a small number of synthetic samples that can quickly train a network to the same, or substantially the same, accuracy it would achieve if trained on the original (complete) data set. It may seem counter-intuitive that training a model on a small number of synthetic images coming from a completely different distribution than the training data can achieve the original accuracy, but for models with known initializations, this is indeed feasible. For example, DD has been shown to achieve 94% accuracy on MNIST, for a hand-written digit recognition task, after training LeNet on just ten synthetic images. The MNIST database (Modified National Institute of Standards and Technology database) is a large database of handwritten digits that is commonly used for training various image-based information processing systems.

Self-training is a form of a semi-supervised learning method, which iteratively generates task-specific pseudo-labels using a model trained on some labelled data and then retrains the model using the labelled data. However, there are some technical issues in this bootstrap process, one of them being noise in the pseudo-labelled data. Some conventional approaches treat this issue as learning from noisy labels, while others realize that the pseudo-labels can be optimized by sample selection or label smoothing. However, none of the conventional approaches focus on data properties. As mentioned, a modified knowledge distillation approach is to distill the large data set into a smaller one to find the meaningful samples such as means in the feature spaces to capture the data properties. Means can also be called bases of the data. These bases can be used to formulate the latent representations of the data in a probabilistic way using an expectation maximization approach.

Returning to FIG. 2, recall that machine learning-based information processing system 200 first trains capsule neural network 204 to obtain capsules 206, and then uses training set 202 and capsules 206 in inheritance relation extraction step 208 to generate soft labels 210 for each capsule. Further details of these steps will now be described.

Figure 4:
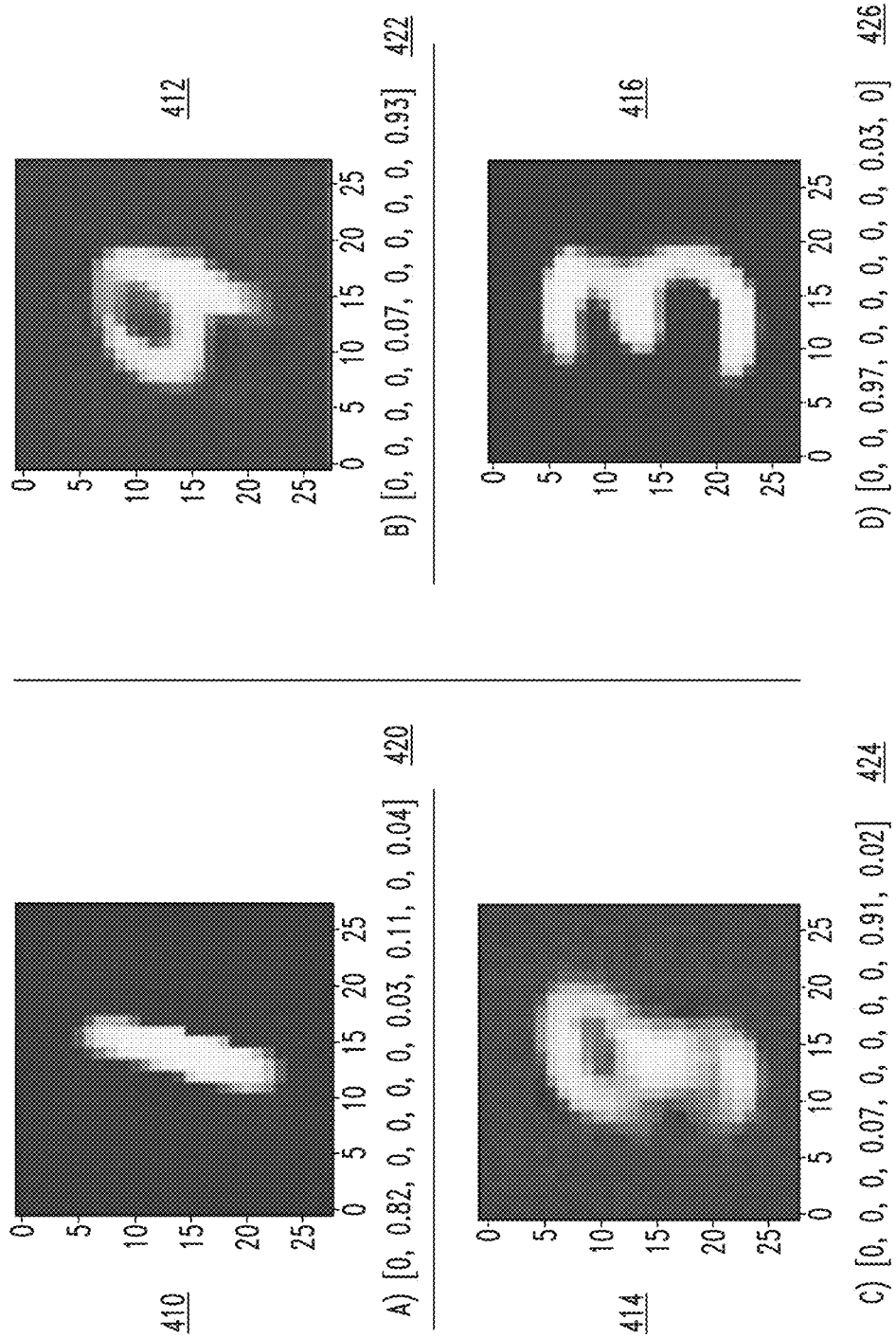
FIG. 4 illustrates an example of extracted capsules in a classification task according to an illustrative embodiment.

Capsule derivation. At first, capsule neural network 204 is trained using a conventional classification task on training set 202. Then, capsules 206 are extracted inside the trained network as illustrated in FIG. 4. When visualizing capsules 206, they are meaningful and contain almost all information in the original data set because of the orthogonality of the capsules. Therefore, capsules 206 can also be viewed as distilled data.

FIG. 4 depicts a visualization 400 of extracted capsules 410, 412, 414 and 416 in the MNIST classification task. Corresponding soft labels are also generated using this strategy. Note that the information listed under the image for each capsule 410, 412, 414 and 416 represents the soft label of this image, i.e., soft label 420 corresponds to capsule 410, soft label 422 corresponds to capsule 412, soft label 424 corresponds to capsule 414, and soft label 426 corresponds to capsule 416. Thus, for each soft label 420, 422, 424 and 426, ten values are used to represent the probability of ten numbers from 0-9, i.e., [probability that image is number 0, probability that image is number 1, probability that image is number 2, probability that image is number 3, probability that image is number 4, probability that image is number 5, probability that image is number 6, probability that image is number 7, probability that image is number 8, probability that image is number 9].

However, to be a distilled data set, labels are needed for downstream tasks. Accordingly, illustrative embodiments provide a PBoI approach for soft label generation. As mentioned above, topics can be derived from the trained capsule neural network as illustrated in FIG. 4. The capsules are patterns of the original data set similar to topics in a topic model. Thus, the topic distribution can be identified for each image which can be used to generate a PBoI representation for each topic (capsule).

Figure 5:
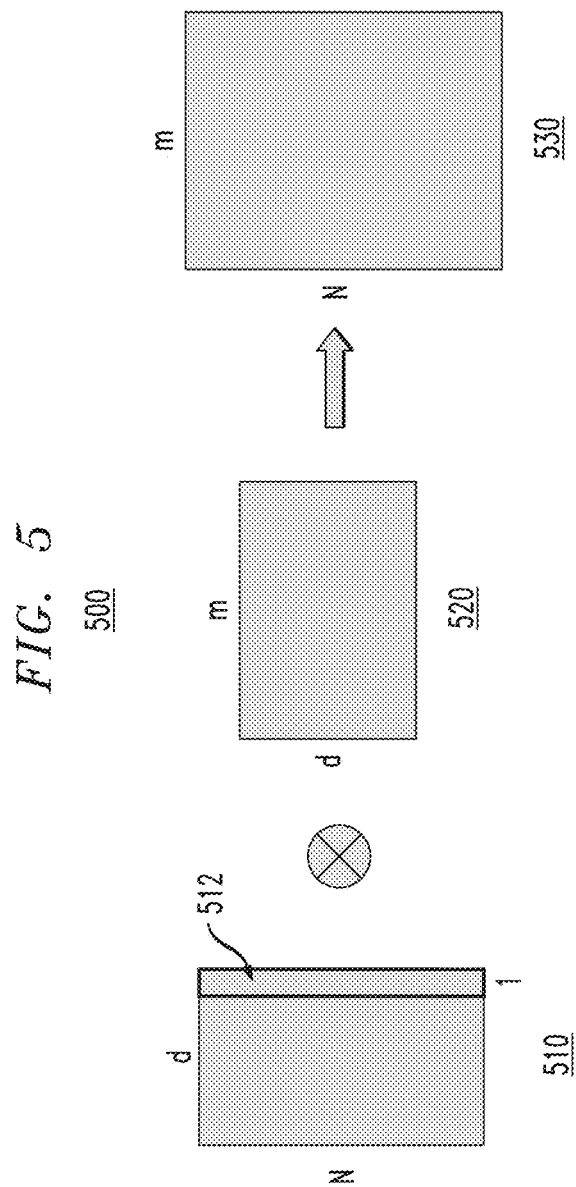
FIG. 5 illustrates a probabilistic bag of images generation process according to an illustrative embodiment.

FIG. 5 illustrates a PBoI generation process 500 according to an illustrative embodiment. It is assumed that N samples with d capsules generate a N*1 PBoI representation for one topic, while each capsule has d dimensions. After multiplication, the feature representation of the original image is obtained, as will now be explained.

More particularly, as shown in FIG. 5, assume that matrix 510 represents N samples and d capsules and, after the training described above, matrix 520 is a d*m matrix with m representing the dimension of each capsule. Then, to obtain the final feature representations, PBoI generation process 500 obtains an N*d matrix which represents the relation between images and capsules, i.e., equivalent to topic distribution in topic models. Note that each column in the N*d matrix, e.g., column 512 shown in matrix 510, becomes the PBoI representation of each capsule, where the value inside the PBoI representation represents the similarity between the image and this particular capsule. After multiplication of matrix 510 with matrix 520, the feature representation of the original image is obtained as N*m matrix 530.

Finally, when all N samples have their own labels, PBoI generation process 500 generates soft labels by weighted summation inside the PBoI representation. Recall that FIG. 4 shows some exemplary results. For example, for capsule 410, most of the samples inside its PBoI representation are 1, so its soft label 420 is [0, 0.82, 0, 0, 0, 0, 0.03, 0.11, 0, 0.04], indicating that there is an 82% likelihood that the data instance is an image of the number 1, with a 3% likelihood that it is the number 6, an 11% likelihood that it is the number 7, and a 4% likelihood that it is the number 9. The lower probabilities on soft label 420 are because the image for the number 1 could also be a component in the images of numbers 6, 7 and 9, so some probability is also assigned to these numbers.

Figure 6:
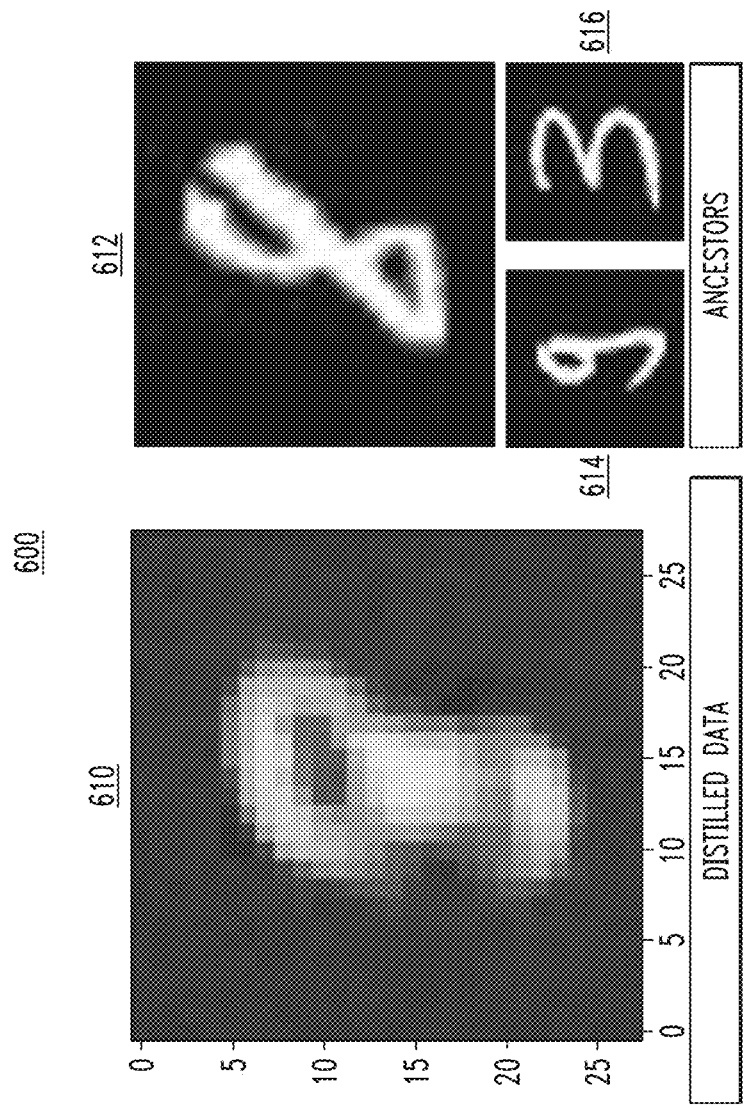
FIG. 6 illustrates an example of ancestor identification according to an illustrative embodiment.

Turning now to FIG. 6, an example 600 of ancestor identification is depicted according to an illustrative embodiment. It is realized herein that for the PBoI representation for each capsule, if normalized, the samples with high similarities can be chosen to be its ancestors. Thus, as shown in example 600, for distilled data 610, only one image is chosen in each class, as it can be seen that numbers 8, 9 and 3 collaboratively generate this capsule. That is, samples 612, 614 and 616 are ancestors of distilled data (image) 610 and, to some extent, image size represents the similarity between them.

If new samples come into the PBoI generation process 500, the similarity between the new samples and capsules can be calculated. The process is similar to the soft label generation process described above, but in the previous one, the PBoI representation is generated during the training process. In this self-training setting, soft labels are generated based on some similarity measurement to calculate the topic distribution for each new image such as matrix 510 in FIG. 5, then weighted summation of the topics is used to obtain the new soft labels (pseudo-labels) for the new images.

Advantageously, as described in detail herein, illustrative embodiments provide a soft label generation process, based on a capsule neural network, to generate soft labels for generated distilled data. For example, it is proposed that PBoI be a basis of the soft label generation. Further, illustrative embodiments also provide an explainable data set distillation algorithm based on the concept of label inheritance. Since ancestors of the distilled data can easily be identified, this largely improves the explain-ability of the data set distillation algorithm. Still further, illustrative embodiments provide a pseudo-label generation process by promoting the current data set distillation algorithm. Thus, by way of advantage, the improved soft label generation strategy described herein leverages capsules and proposes PBoI representations to explicitly generate soft labels. The techniques can also be applied in data set distillation and self-training.

Figure 7:
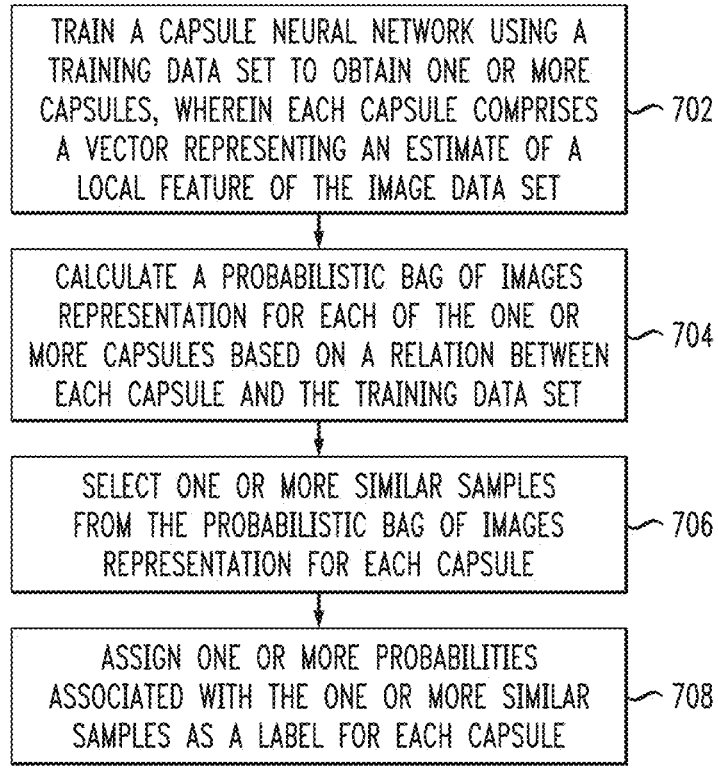
FIG. 7 illustrates a methodology for label inheritance according to an illustrative embodiment.

FIG. 7 illustrates a methodology 700 for label inheritance according to an illustrative embodiment. More particularly, methodology 700 generates at least one label for a given data instance from a training data set useable to train a machine learning-based model, wherein the at least one label is generated by assigning one or more labels associated with one or more ancestors of the data instance such that the data instance inherits the one or more labels associated with the one or more ancestors as the at least one label. This is done in accordance with steps 702 through 708 when the given data instance comprises an image data set and the machine learning-based model comprises a capsule neural network.

Step 702 trains the capsule neural network using the training data set to obtain one or more capsules, wherein each capsule comprises a vector representing an estimate of a local feature of the image data set. Step 704 then calculates a probabilistic bag of images representation for each of the one or more capsules based on a relation between each capsule and the training data set. Further, step 706 selects one or more similar samples from the probabilistic bag of images representation for each capsule. Finally, step 708 assigns one or more probabilities associated with the one or more similar samples as a label for each capsule.

Figure 8:
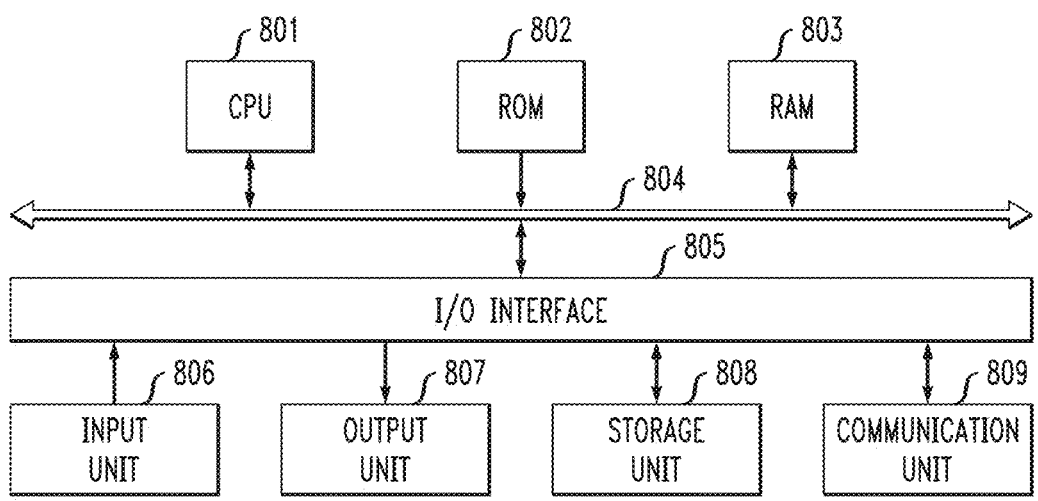
FIG. 8 illustrates a processing platform for an information processing system with label inheritance according to an illustrative embodiment.

FIG. 8 illustrates a block diagram of an example processing device or, more generally, an information processing system 800 that can be used to implement illustrative embodiments. For example, one or more components in FIGS. 1-7 can comprise a processing configuration such as that shown in FIG. 8 to perform steps/operations described herein. Note that while the components of system 800 are shown in FIG. 8 as being singular components operatively coupled in a local manner, it is to be appreciated that in alternative embodiments each component shown (CPU, ROM, RAM, and so on) can be implemented in a distributed computing infrastructure where some or all components are remotely distributed from one another and executed on separate processing devices. In further alternative embodiments, system 800 can include multiple processing devices, each of which comprise the components shown in FIG. 8.

As shown, the system 800 includes a central processing unit (CPU) 801 which performs various appropriate acts and processing, based on a computer program instruction stored in a read-only memory (ROM) 802 or a computer program instruction loaded from a storage unit 808 to a random access memory (RAM) 803. The RAM 803 stores therein various programs and data required for operations of the system 800. The CPU 801, the ROM 802 and the RAM 803 are connected via a bus 804 with one another. An input/output (I/O) interface 805 is also connected to the bus 804.

The following components in the system 800 are connected to the I/O interface 805, comprising: an input unit 806 such as a keyboard, a mouse and the like; an output unit 807 including various kinds of displays and a loudspeaker, etc.; a storage unit 808 including a magnetic disk, an optical disk, and etc.; a communication unit 809 including a network card, a modem, and a wireless communication transceiver, etc. The communication unit 809 allows the system 800 to exchange information/data with other devices through a computer network such as the Internet and/or various kinds of telecommunications networks.

Various processes and processing described above may be executed by the CPU 801. For example, in some embodiments, methodologies described herein may be implemented as a computer software program that is tangibly included in a machine readable medium, e.g., the storage unit 808. In some embodiments, part or all of the computer programs may be loaded and/or mounted onto the system 800 via ROM 802 and/or communication unit 809. When the computer program is loaded to the RAM 803 and executed by the CPU 801, one or more steps of the methodologies as described above may be executed.

Illustrative embodiments may be a method, a device, a system, and/or a computer program product. The computer program product may include a computer readable storage medium having computer readable program instructions thereon for causing a processor to carry out aspects of illustrative embodiments.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of illustrative embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Various technical aspects are described herein with reference to flowchart illustrations and/or block diagrams of methods, device (systems), and computer program products according to illustrative embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor unit of a general purpose computer, special purpose computer, or other programmable data processing device to produce a machine, such that the instructions, when executed via the processing unit of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing device, or other devices to cause a series of operational steps to be performed on the computer, other programmable devices or other devices to produce a computer implemented process, such that the instructions which are executed on the computer, other programmable devices, or other devices implement the functions/acts specified in the flowchart and/or block diagram block or blocks.

The flowchart and block diagrams illustrate architecture, functionality, and operation of possible implementations of systems, methods and computer program products according to various embodiments. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   training a capsule neural network that incorporates one or more dynamic routing algorithms to estimate features of objects using a training data set comprising a plurality of image data instances to generate one or more mutually orthogonal capsules corresponding to one or more data instances of the training data set, each mutually orthogonal capsule comprising a vector representing an estimate of a local feature of a corresponding image data instance;
   extracting the one or more mutually orthogonal capsules inside the trained capsule neural network;
   computing a probabilistic bag of images representation for each of the one or more mutually orthogonal capsules based on a relation between each mutually orthogonal capsule and the training data set, the computing comprising:
      generating a first matrix associated with the training data set and the one or more mutually orthogonal capsules;
      generating a second matrix associated with the one or more mutually orthogonal capsules and corresponding dimensions of the one or more mutually orthogonal capsules; and
      multiplying the first matrix and the second matrix;
   identifying one or more ancestors of a given data instance based on the probabilistic bag of images representation of a given mutually orthogonal capsule associated with the given data instance;
   generating at least one soft label for the given data instance from the training data set, wherein the at least one soft label is generated by:
      comparing the probabilistic bag of images representation to the identified one or more ancestors of the given data instance to compute a similarity value for each of the identified one or more ancestors; and
      assigning one or more labels associated with one or more ancestors of the given data instance based on the computed similarity values such that the given data instance inherits the one or more labels associated with at least one of the identified one or more ancestors of the given data instance as the at least one soft label; and
   iteratively re-training the capsule neural network by inputting one or more new data instances to generate at least one or more new soft labels for the one or more new data instances, the generating comprising generating a third matrix associated with the one or more new data instances and the one or more mutually orthogonal capsules to identify one or more ancestors of each of the one or more new data instances and to compute a similarity value for each of the identified one or more ancestors of each of the one or more new data instances, the one or more new soft labels further being associated with the one or more ancestors of the one or more new data instances;
   wherein the method is performed by at least one processor and at least one memory storing executable computer program instructions.

2. The method of claim 1, wherein the step of generating the at least one soft label for the given data instance further comprises selecting one or more similar samples from the probabilistic bag of images representation for each mutually orthogonal capsule, and assigning one or more probabilities associated with the one or more similar samples as a soft label for each mutually orthogonal capsule.

3. The method of claim 1, wherein each mutually orthogonal capsule represents a topic associated with the corresponding image data instance.

4. The method of claim 1, further comprising using each mutually orthogonal capsule as distilled data in a proxy data generation application.

5. The method of claim 1, further comprising using each mutually orthogonal capsule as distilled data in a neural network self-training application.

6. The method of claim 1, wherein identifying the one or more ancestors of the given data instance further comprises:
   normalizing the probabilistic bag of images representation; and
   selecting as the one or more ancestors a predetermined number of samples from the training data set having the highest computed similarity values relative to the given mutually orthogonal capsule.

7. The method of claim 1, wherein assigning the one or more labels comprises performing a weighted summation of labels associated with the identified one or more ancestors, wherein a weight for the label of each ancestor is based on its computed similarity value.

8. The method of claim 1, wherein each value in the probabilistic bag of images representation represents a similarity between a corresponding image data instance in the training data set and the given mutually orthogonal capsule.

9. The method of claim 1, wherein assigning the one or more labels comprises performing a weighted summation of labels associated with the identified one or more ancestors, wherein a weight for the label of each ancestor is based on its computed similarity value.

10. The method of claim 1, wherein each value in the probabilistic bag of images representation represents a similarity between a corresponding image data instance in the training data set and the given mutually orthogonal capsule.

11. An apparatus, comprising:
    at least one processor and at least one memory storing computer program instructions wherein, when the at least one processor executes the computer program instructions, the apparatus is configured to:

train a capsule neural network that incorporates one or more dynamic routing algorithms to estimate features of objects using a training data set comprising a plurality of image data instances to generate one or more mutually orthogonal capsules corresponding to one or more data instances of the training data set, each mutually orthogonal capsule comprising a vector representing an estimate of a local feature of a corresponding image data instance;

extract the one or more mutually orthogonal capsules inside the trained capsule neural network;

compute a probabilistic bag of images representation for each of the one or more mutually orthogonal capsules based on a relation between each mutually orthogonal capsule and the training data set, the computing comprising:
  generating a first matrix associated with the training data set and the one or more mutually orthogonal capsules;
  generating a second matrix associated with the one or more mutually orthogonal capsules and corresponding dimensions of the one or more mutually orthogonal capsules; and
  multiplying the first matrix and the second matrix;

identify one or more ancestors of a given data instance based on the probabilistic bag of images representation of a given mutually orthogonal capsule associated with the given data instance;

generate at least one soft label for the given data instance from the training data set, wherein the at least one soft label is generated by:
  comparing the probabilistic bag of images representation to the identified one or more ancestors of the given data instance to compute a similarity value for each of the identified one or more ancestors; and
  assigning one or more labels associated with one or more ancestors of the given data instance based on the computed similarity values such that the given data instance inherits the one or more labels associated with at least one of the identified one or more ancestors of the given data instance as the at least one soft label; and iteratively re-train the capsule neural network by inputting one or more new data instances to generate one or more new soft labels for the one or more new data instances, the generating comprising generating a third matrix associated with the one or more new data instances and the one or more mutually orthogonal capsules to identify one or more ancestors of each of the one or more new data instances and to compute a similarity value for each of the identified one or more ancestors of each of the one or more new data instances, the one or more new labels further being associated with the one or more ancestors of the one or more new soft data instances.

12. The apparatus of claim 11, wherein generating the at least one soft label for the given data instance further comprises selecting one or more similar samples from the probabilistic bag of images representation for each mutually orthogonal capsule, and assigning one or more probabilities associated with the one or more similar samples as a soft label for each mutually orthogonal capsule.

13. The apparatus of claim 11, wherein each mutually orthogonal capsule represents a topic associated with the corresponding image data instance.

14. The apparatus of claim 11, wherein the apparatus is further configured to use each mutually orthogonal capsule as distilled data in a proxy data generation application.

15. The apparatus of claim 11, wherein the apparatus is further configured to use each mutually orthogonal capsule as distilled data in a neural network self-training application.

16. The apparatus of claim 11, wherein identifying the one or more ancestors of the given data instance further comprises:
  normalizing the probabilistic bag of images representation; and
  selecting as the one or more ancestors a predetermined number of samples from the training data set having the highest computed similarity values relative to the given mutually orthogonal capsule.

17. A computer program product stored on a non-transitory computer-readable medium and comprising machine executable instructions, the machine executable instructions, when executed, causing a processing device to:
  train a capsule neural network that incorporates one or more dynamic routing algorithms to estimate features of objects using a training data set comprising a plurality of image data instances to generate one or more mutually orthogonal capsules corresponding to one or more data instances of the training data set, each mutually orthogonal capsule comprising a vector representing an estimate of a local feature of a corresponding image data instance;
  extract the one or more mutually orthogonal capsules inside the trained capsule neural network;
  compute a probabilistic bag of images representation for each of the one or more mutually orthogonal capsules based on a relation between each mutually orthogonal capsule and the training data set, the computing comprising:
    generating a first matrix associated with the training data set and the one or more mutually orthogonal capsules;
    generating a second matrix associated with the one or more mutually orthogonal capsules and corresponding dimensions of the one or more mutually orthogonal capsules; and
    multiplying the first matrix and the second matrix;
  identify one or more ancestors of a given data instance based on the probabilistic bag of images representation of a given mutually orthogonal capsule associated with the given data instance;
  generate at least one soft label for the given data instance from the training data set, wherein the at least one soft label is generated by:
    comparing the probabilistic bag of images representation to the identified one or more ancestors of the given data instance to compute a similarity value for each of the identified one or more ancestors; and
    assigning one or more labels associated with one or more ancestors of the given data instance based on the computed similarity values such that the given data instance inherits the one or more labels associated with at least one of the identified one or more ancestors of the given data instance as the at least one soft label; and
  iteratively re-train the capsule neural network by inputting one or more new data instances to generate one or more new soft labels for the one or more new data instances, the generating comprising generating a third matrix associated with the one or more new data instances and the one or more mutually orthogonal capsules to identify one or more ancestors of each of the one or more new data instances and to compute a similarity value for each of the identified one or more ancestors of each of the one or more new data instances, the one or more new soft labels further being associated with the one or more ancestors of the one or more new data instances.

18. The computer program product of claim 17, wherein assigning the one or more labels comprises performing a weighted summation of labels associated with the identified one or more ancestors, wherein a weight for the label of each ancestor is based on its computed similarity value.

19. The computer program product of claim 17, wherein each value in the probabilistic bag of images representation represents a similarity between a corresponding image data instance in the training data set and the given mutually orthogonal capsule.

20. The computer program product of claim 17, wherein identifying the one or more ancestors of the given data instance further comprises:
  normalizing the probabilistic bag of images representation; and
  selecting as the one or more ancestors a predetermined number of samples from the training data set having the highest computed similarity values relative to the given mutually orthogonal capsule.

* * * * *